US010423652B2

(12) United States Patent
Zhai et al.

(10) Patent No.: US 10,423,652 B2
(45) Date of Patent: Sep. 24, 2019

(54) KNOWLEDGE GRAPH ENTITY RECONCILER

(71) Applicant: Baidu USA LLC, Sunnyvale, CA (US)

(72) Inventors: Jing Zhai, Sunnyvale, CA (US); Richard Chun Ching Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 391 days.

(21) Appl. No.: 15/231,522

(22) Filed: Aug. 8, 2016

(65) Prior Publication Data

US 2018/0039696 A1 Feb. 8, 2018

(51) Int. Cl.
*G06F 16/35* (2019.01)
*G06F 16/33* (2019.01)
*G06F 16/901* (2019.01)
*G06F 16/36* (2019.01)

(52) U.S. Cl.
CPC ............ *G06F 16/35* (2019.01); *G06F 16/334* (2019.01); *G06F 16/3337* (2019.01); *G06F 16/367* (2019.01); *G06F 16/9024* (2019.01)

(58) Field of Classification Search
CPC .......... G06Q 30/0251; G06F 17/30958; G06F 17/2785; G06F 17/30619; G06F 16/951; G06F 16/9024; G06F 16/3334; G06F 16/316; G06F 16/35; G07F 17/30598
See application file for complete search history.

(56) References Cited

U.S. PATENT DOCUMENTS

| | | | | |
|---|---|---|---|---|
| 9,785,696 | B1* | 10/2017 | Yakhnenko | ....... G06F 17/30598 |
| 2009/0024556 | A1* | 1/2009 | Hirsch | ................. G06F 16/951 |
| | | | | 706/55 |
| 2012/0330985 | A1* | 12/2012 | Borzello | ............... G06F 16/316 |
| | | | | 707/756 |
| 2013/0110641 | A1* | 5/2013 | Ormont | ............. G06Q 30/0251 |
| | | | | 705/14.66 |
| 2014/0309989 | A1* | 10/2014 | Sikstrom | ............. G06F 17/2785 |
| | | | | 704/9 |
| 2016/0232157 | A1* | 8/2016 | Mansour | ............. G06F 16/3334 |
| 2017/0132329 | A1* | 5/2017 | Yakout | ................ G06F 16/9024 |

* cited by examiner

*Primary Examiner* — Etienne P Leroux
(74) *Attorney, Agent, or Firm* — Womble Bond Dickinson (US) LLP (57) ABSTRACT

Systems and methods are disclosed for extending and reinforcing a knowledge graph using wiki-like web pages as a source of information. A web crawler parse a wiki-like source and obtain a topic entity from the source. Relationships between the topic entity and sub-topics within the source are identified and a graph is built with the topic and relationships to sub-topics. A candidate topic in the knowledge graph is identified, and a sub-graph of the knowledge graph is either identified or generated. The knowledge sub-graph contains the candidate topic and relationships to sub-topics. A similarity is computed between the source graph and the knowledge sub-graph. If the two graphs are sufficiently similar, then the source topic graph is merged with the knowledge graph.

21 Claims, 7 Drawing Sheets

United States

From Wikipedia, the free encyclopedia

Coordinates:  40°8′100°W

"United States of America", "America", "US", "U.S.", "USA", and "U.S.A." redirect here. For the landmass encompassing North and South America, see Americas. For other uses, see America (disambiguation), US (disambiguation), USA (disambiguation), and United States (disambiguation).

510

The United States of America (USA), commonly referred to as the United States (U.S.) or America, is a federal republic composed of 50 states, the federal district of Washington, D.C., five major self-governing territories, and various possessions.[n][e] The 48 contiguous states and federal district are in central North America between Canada and Mexico, with the state of Alaska in the northwestern part of North America and the state of Hawaii comprising an archipelago in the mid-Pacific. The territories are scattered about the Pacific Ocean and the Caribbean Sea. At 3.8 million square miles (9.8 million km²)[n] and with over 320 million people, the U.S. is the world's third largest country by total area (and fourth largest by land area)[n][e] and the third most populous. It is one of the world's most ethnically diverse and multicultural nations, the product of large-scale immigration from many other countries.[24] The geography and climate are also extremely diverse, and the country is home to a wide variety of wildlife.[25]

Paleo-Indians migrated from Asia to the North American mainland at least 15,000 years ago,[26] with European colonization beginning in the 16th century. The United States emerged from 13 British colonies along the East Coast. Numerous disputes between Great Britain and the colonies led to the American Revolution, which began in 1775. On July 4, 1776, as the colonies were fighting Great Britain in the American Revolutionary War, delegates from the 13 colonies

515

United States of America

Flag     Great Seal

| | |
|---|---|
| Capital | Washington, D.C. |
| Largest city | New York City |
| Official languages | None at federal level[f] |
| National language | English[d] |
| Ethnic groups | 72.41% White<br>12.61% Black<br>9.11% Other/Multiracial<br>4.75% Asian<br>1.12% Native[e][f] |
| Demonym | American |
| Government | Federal presidential constitutional republic |
| • President | Barack Obama |
| • Vice President | Joe Biden |
| • Speaker of the House | Paul Ryan |
| • Chief Justice | John Roberts |

KNOWLEDGE GRAPH ENTITY RECONCILER

TECHNICAL FIELD

Embodiments of the present invention relate generally to enhancement and reinforcement of a computer-implemented knowledge graph.

BACKGROUND

A knowledge graph is a representation of a knowledge base that provides search results from a wide variety of sources. The knowledge graph can provide structured, detailed information about a topic by traversing relationships between a topic and nodes of the knowledge graph. Given an example topic, e.g., "United States," a relationship can be an alias relationship such as "is also known as" to a node "America." Other examples of relationships for United States may include "President's name," "per capita income," "government type," "capital," "largest city," or "national language."

Internet sources can be good sources of information for use in extending or reinforcing a knowledge graph. However, not all internet sources are reliable sources for extending or reinforcing a knowledge graph. When adding to a knowledge graph, it is important to avoid duplication and to avoid erroneous addition to the knowledge graph. Thus, knowledge graphs are frequently maintained manually, by a person, or team of people.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a computer-implemented method for reinforcing and enhancing a knowledge graph can crawl the internet, and locate a data source. The data source can be parsed into a plurality of entities and relationships between the entities. At least one of the entities can be a topic entity for the data source. A sub-graph can be generated for the data source, using the topic entity and relationships connected to the topic entity, and additional entities pointed to by the relationships. A candidate topic entity can be selected from a knowledge graph and a sub-graph of the candidate topic can be identified in, or generated from, the knowledge graph. The two sub-graphs can be compared to determine whether the data source topic entity sub-graph is sufficiently similar to the candidate topic sub-graph of the knowledge graph that the data source topic entity sub-graph should be merged with the knowledge graph. If the two sub-graphs as not sufficiently similar, then the data source topic entity sub-graph can either be processed manually or discarded.

In an embodiment, any of the above functionality can be embodied as executable instructions stored on non-transitory computer-readable medium. In an embodiment, a system can comprise at least one hardware processor coupled to a memory comprising instructions that, when executed by the at least one hardware processor, can implement any of the above functionality.

Figure 1A:
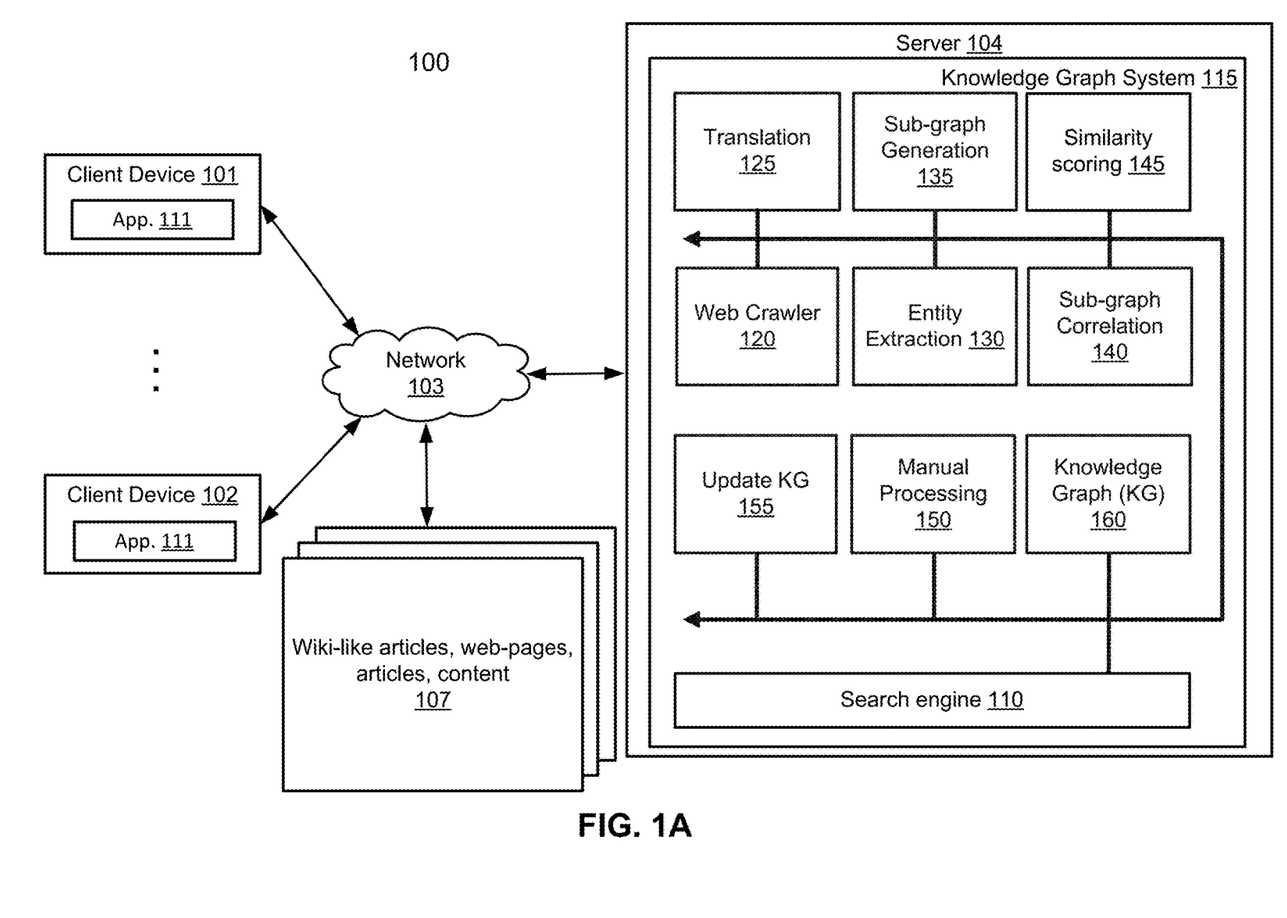
FIG. 1A is a block diagram illustrating an example of an online system that can enhance and reinforce a knowledge graph, according to an embodiment of the invention.

FIG. 1A is a block diagram illustrating an online system 100 that can enhance and reinforce a knowledge graph, according to an embodiment of the invention. Referring to FIG. 1A, system 100 includes, but is not limited to, one or more client devices 101-102 communicatively coupled to server 104 over network 103. Client devices 101-102, also referred to as user devices, may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless. Client devices 101 and 102 can have one or more applications 111, such as a web browser, to facilitate interaction with server 104.

According to one embodiment, user device 101 may be associated with an end user, where user device 101 may be a mobile device (e.g., tablets), a Smartphone, a Smartwatch, or a device capable of communicating with other devices over a network 103.

The user application 111 may be a browser application or a mobile application if the user device is a mobile device. Search engine 110 may be a Baidu® search engine available from Baidu, Inc. or alternatively, search engine 110 may represent a Google® search engine, a Microsoft Bing™ search engine, a Yahoo® search engine, or other search engine.

A search engine 110, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines 110 also maintain real-time information by running an algorithm on a web crawler, such as web crawler 120.

Web search engines 110 work by storing information about many web pages, which they retrieve from the hypertext markup language (HTML) markup of the pages. These pages are retrieved by a Web crawler 120, which is an automated Web crawler which follows every link on a site, e.g. server 107. The search engine 110 then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine 110 (typically by using one or more keywords), the search engine 110 examines its index and provides a listing of best-matching web pages according to its criteria, usually with a short summary containing the document's title and sometimes parts of the text. The index is built from the information stored with the data and the method by which the information is indexed. The search engine 110 looks for the words or phrases exactly as entered. Some search engines 110 provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine 110 depends on the relevance of the result set it gives back. While there may be millions of web pages that include a particular word or phrase, some pages may be more relevant, popular, or authoritative than others. Most search engines 110 employ methods to rank the results to provide the "best" results first. How a search engine 110 decides which pages are the best matches, and what order the results should be shown in, varies widely from one engine to another.

Server 104 may be any kind of server or clusters of servers, such as Web or cloud servers, application servers, backend servers, or a combination thereof. In one embodiment, server 104 includes, but is not limited to, an online knowledge graph system 115. Online knowledge graph system 115 can include search engine 110, web crawler 120, translation module 125, entity extraction module 130, sub-graph generation module 135, sub-graph correlation module 140, similarity scoring module 145, manual processing interface 150, update knowledge graph module 155, and knowledge graph 160. Server 104 further includes an interface (not shown) to allow a client such as client devices 101-102 to access resources or services provided by server 104. The interface may include a Web interface, an application programming interface (API), and/or a command line interface (CLI).

For example, a client user application 111 of user device 101, may send a search query to server 104 and the search query is received by search engine 110 via an interface over network 103. In response to the search query, search engine 110 extracts one or more keywords from the search query, the keywords representing topics in the knowledge graph 160.

Network crawlers or Web crawlers, such as web crawler 120, are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 110. Web crawlers 120 can use various protocols to download pages associated with URLs, such as hypertext transport protocol (HTTP) and file transfer protocol (FTP).

Web crawler 120 can crawl the internet for data sources such as server 107 that can contain wiki-like articles, web pages, articles, and other content. Entity extraction module 130 can extract entities, including one or more topics within the data source, and relationships between the topics extracted from the data source. Translation module 125 can provide a translation of one or more topics extracted from the data source to a language supported by the knowledge graph 160. Sub-graph generation module 135 can generate a sub-graph of the data source using a main topic of the data source and relationships between the main topic and one or more additional topics within the data source. Sub-graph correlation module 140 can determine a candidate entity within the knowledge graph 160 that may correlate to the main topic of the data source. Sub-graph correlation module 140 can further compare relationships and topic nodes of the sub-graph of the data source to relationships and topic nodes of the candidate entity in the knowledge graph 160. Similarity scoring module 145 can determine a similarity score between the data source sub-graph and the candidate entity sub-graph of the knowledge graph 160. If the similarity score is above a high threshold, then the data source sub-graph can be merged with the knowledge graph 160 by update knowledge graph (KG) module 155. If the similarity score is below a low threshold, then the data source sub-graph can be discarded. Otherwise, in an embodiment, the data source may be subject to manual processing via manual processing interface 150. In an embodiment, the high threshold value can be 90% similarity between the data source sub-graph and the candidate entity sub-graph of the knowledge graph 160. In an embodiment, the low threshold can be 10% similarity between the data source sub-graph and the candidate entity sub-graph of the knowledge graph 160. Further details of online knowledge graph system 115 are described below with reference to FIG. 1B.

Figure 1B:
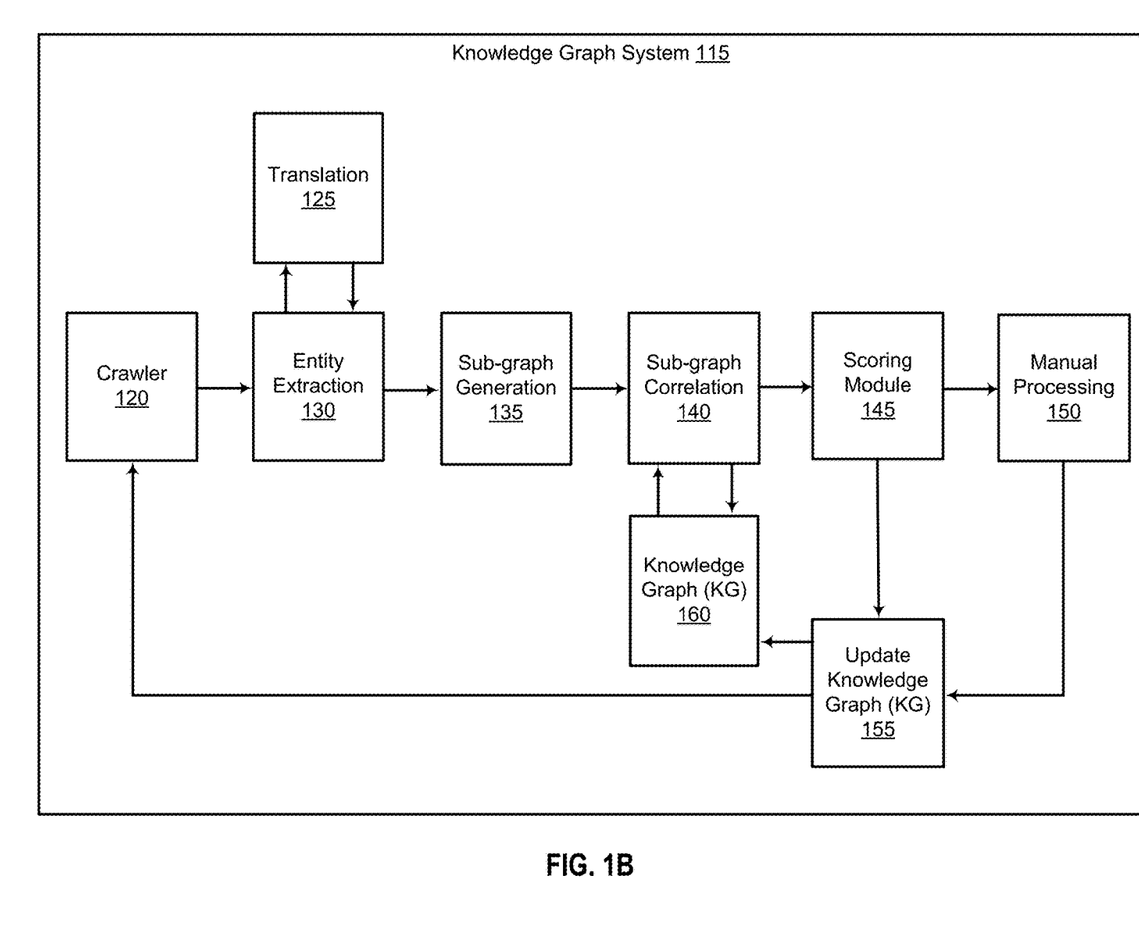
FIG. 1B is a block diagram illustrating an information and logic flow of an online system that can enhance and reinforce a knowledge graph, according to an embodiment of the invention.

FIG. 1B is a block diagram illustrating an information and logic flow of an online knowledge graph system 115 that can enhance and reinforce a knowledge graph 160, according to an embodiment of the invention.

Web crawler 120 can crawl the internet looking for data sources, such as on server 107. Data sources can include wiki-like articles, web pages, articles and other content found by web crawler 120. A data source has a topic, or entity name, that is the main topic of the data source. For example, a data source can have a topic of "United States," as shown below in FIG. 4. The entity name for the data source can be obtained from a title of the data source.

Entity extraction module 130 can parse the data source to identify a plurality of entities (topics) in an article and corresponding relationships between the data source topic and each of the plurality of entities (topics) extracted by the data source. Entity extraction module 130 can extract all entities and relationships in the data source. In an embodiment, entity extraction module 130 can discard relationships and entities that are not known to the knowledge graph 160. A relationship, e.g. "is an alias for" is known to the knowledge graph 160 if any entity in the knowledge graph 160 uses the "is an alias for" (or "also known as") relationship. An entity is known to the knowledge graph 160 if any relationship in the knowledge graph 160 uses the entity. For example, if the knowledge graph 160 has an entity "Britain" with a relationship "has national language" pointing to entity "English", and an entity "United States" with the relationship "has national language" pointing to entity "English," then the relationship "has national language" and the entities "Britain," "United States", and "English" are all known to the knowledge graph 160. Thus, if a data source topic entity, e.g. "United States" has a relationship "is allies with" and the relationship points to "Britain," then both entities, "Britain" and "United States" are deemed to be known to the knowledge graph 160, based on the existence of both entities in the knowledge graph 160 with the relationship "has national language."

Entity extraction module 130 can interact with translation module 125 to translate entities or other data source text from a language of the data source to a language of the knowledge graph 160. For example, the data source may be in Chinese and the knowledge graph 160 may be in English. During parsing of the topic entity, words from an abstract of the data source, or other text that is descriptive of the title of the data source, can used to generate a context for the topic entity. A context can be a vector of words and frequencies that describe an entity, in this case the topic entity. Entity extraction module 130 can also build a context for each entity in the data source. The context can be used to determine a similarity between entities in the data source sub-graph and potentially corresponding entities in a sub-graph of the knowledge graph 160. Entity extraction module 130 can also extract relationships between entities in the data source. Relationships may be set forth in the structure of data, such as a table. For example, for topic entity "United States," a table may list "National language" as "English." Thus, national language is a relationship from topic entity "United States" to entity "English." A relationship in non-structured data, such as free-form text, can be extracted by natural language parsing of the text. For example, a sentence in the data source may state, "The United States is also known as 'America,' or 'U.S.A.'". The phrase, "is also known as," is an alias relationship between topic entity "United States," and the entities "America" and "U.S.A."

Sub-graph generation module 135 can generate a sub-graph of entities and relationships for the data source and the knowledge graph 160. A sub-graph can have at its center the topic entity, e.g. "United States." Relationships between entity node United States and other entities in the data source are added as arcs (edges) in the sub-graph between the topic entity node and other entity nodes. In an embodiment, relationships are directed arcs in the data source sub-graph. In an embodiment, the sub-graph contains only relationships and entity nodes that connect to the entity topic node in the sub-graph. In an embodiment, the data source sub-graph contains only relationships and entities that are known to the knowledge graph 160.

Sub-graph correlation module 140 can determine a candidate entity in knowledge graph 160 that is similar to the data source topic entity of the data source sub-graph. Sub-graph correlation module 140 can then identify a sub-graph of knowledge graph 160 that contains relationships from the candidate entity in the knowledge graph 160 to other entities in the knowledge graph 160, and the other entities pointed to by the relationships from the candidate entity in the knowledge graph 160. In an embodiment, sub-graph correlation module 140 can generate a sub-graph of knowledge graph 160 containing the candidate entity, relationships to other entities in the knowledge graph 160, and the other entities that are pointed to by the relationships.

Similarity scoring module 145 can determine a similarity score that indicates how similar the data source sub-graph is to the candidate entity sub-graph of the knowledge graph 160. If the data source sub-graph is greater than a high threshold similarity to the candidate entity sub-graph of the knowledge graph 160, then the data source sub-graph can be merged with the knowledge graph 160 by update knowledge graph module 155. If the data source sub-graph is lower than a low threshold similarity to the candidate entity sub-graph of the knowledge graph 160, then the data source sub-graph can be discarded. Otherwise the data source sub-graph can be processed manually, by one or more people, using manual processing interface 150. In an embodiment, the high threshold can be 90% similarity. In an embodiment, the low threshold can be 10% similarity. Similarity scoring module 145 can determine the similarity of the data source sub-graph to the candidate entity sub-graph of the knowledge graph by comparing the similarity of the data source topic entity to the candidate entity and comparing a similarity of relationships (edges) of the data source sub-graph to edges of the candidate entity sub-graph relationships. In an embodiment, similarity can further be determined by comparing contexts of entity nodes of the data source sub-graph with contexts of entity nodes of the candidate entity sub-graph of the knowledge graph 160. In an embodiment, a similarity score, S, can be computed as:

$$S = a * \text{entity similarity} + b * \text{edge similarity} + c * \text{context similarity},$$

wherein a, b, and c are weighting constants.

In an embodiment, each term in the above score S is in the range of [0 . . . 1] and is normalized such that S is in the range [0 . . . 1]. Weighting constants a, b, and c, may be initially selected then later tuned with different values. In an embodiment, manual processing interface 150 an be used to tune the weighting constants a, b, and c in response to evaluating data source sub-graphs that have been designated for manual processing. Evaluation of manually processed sub-graphs can determine whether, and why, one or more of the data source sub-graphs should have been merged into the knowledge graph 160. In an embodiment, one or more of the high and low threshold values can be tuned using the manual processing interface 150.

Entity similarity can be determined by comparing the text of the data source topic name with the text of the candidate entity name. In an embodiment, translation module 125 can be used during entity extraction 130 to obtain text of the data source topic entity name in the same language as the knowledge graph 160. In an embodiment, translation module 125 can further comprise a thesaurus and/or dictionary to disambiguate the data source topic name and candidate entity name. For example, a data source topic name of "apple" may refer to a fruit or a corporation.

In an embodiment, edge similarity can be determined by comparing the number of similar or same edges (relationships) in the sub-graphs radiating from data source sub-graph topic entity and from candidate entity of the sub-graph of the knowledge graph 160. Given a data source sub-graph X and candidate entity sub-graph A, then an edge similarity can be determined as:

$$\text{Edge similarity} = \frac{A \cap X}{A \cup X}.$$

An example of edge similarity will be described with reference to FIG. 4, below.

In an embodiment, context similarity can be determined by taking the cosine of the product of the data source entity context vector and the candidate entity context vector.

If the similarity score between the data source sub-graph and the candidate entity sub-graph of the knowledge graph is greater than a high threshold, then the update knowledge graph module 155 can merge the data source sub-graph with the knowledge graph 160. If the similarity score is lower than a low threshold, then the data source sub-graph can be discarded. Otherwise, the data source sub-graph can be processed manually be one or more people using the manual processing interface 150.

Figure 2:
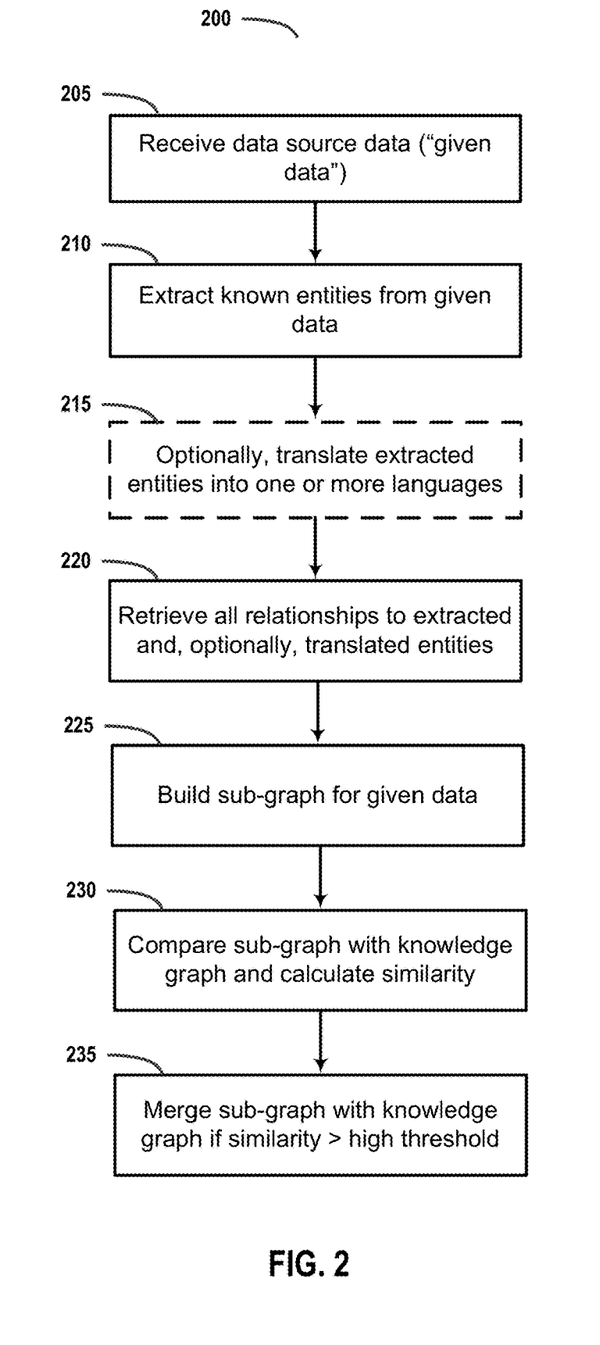
FIG. 2 is a block flow diagram of a method of enhancing and reinforcing a knowledge graph according to an embodiment of the invention.

FIG. 2 is a block flow diagram of a method 200 of enhancing and reinforcing a knowledge graph 160 according to an embodiment of the invention. In operation 205, web crawler 120 can receive data source data from server 107. In operation 210, entity extraction module 130 can extract known entities from the data source. A topic entity of the data source can be determined by the entity extraction module 130. In an embodiment, in operation 215, translation module 125 can be used to optionally translate data source text from the language of the data source into a language of the knowledge graph 160. In an embodiment, knowledge graph 160 can contain entities in more than one language. In operation 220, entity extraction module 130 can extract from the data source all relationships between entities in the data source. In an embodiment, extraction module 130 can discard one or more data source relationships or entities that are not known to the knowledge graph 160. In operation 225, sub-graph generation module 135 can build a data source sub-graph using the data source topic entity and the relationships connected to the data source topic, and entities pointed to by the relationships of the data source. Sub-graph generation module 135 can also identify a candidate topic in the knowledge graph that corresponds to the data source topic entity. Sub-graph generation module 135 can then identify, or generate, a sub-graph of the knowledge graph 160 using the candidate entity of the knowledge graph 160 and relationships, and the entities pointed by the relationships, in the knowledge graph 160 that connect to the candidate entity. In operation 230, sub-graph correlation module 140 can determine a correlation between the data source topic entity sub-graph and the candidate entity sub-graph of the knowledge graph 160. Similarity scoring module 145 can determine a similarity score of the data source topic entity sub-graph to the candidate entity sub-graph of the knowledge graph 160. In operation 235, if the similarity score is greater than a high threshold value, then the update knowledge graph module 155 can merge the data source topic entity sub-graph with the knowledge graph 160 at the candidate entity of the knowledge graph 160.

Figure 3:
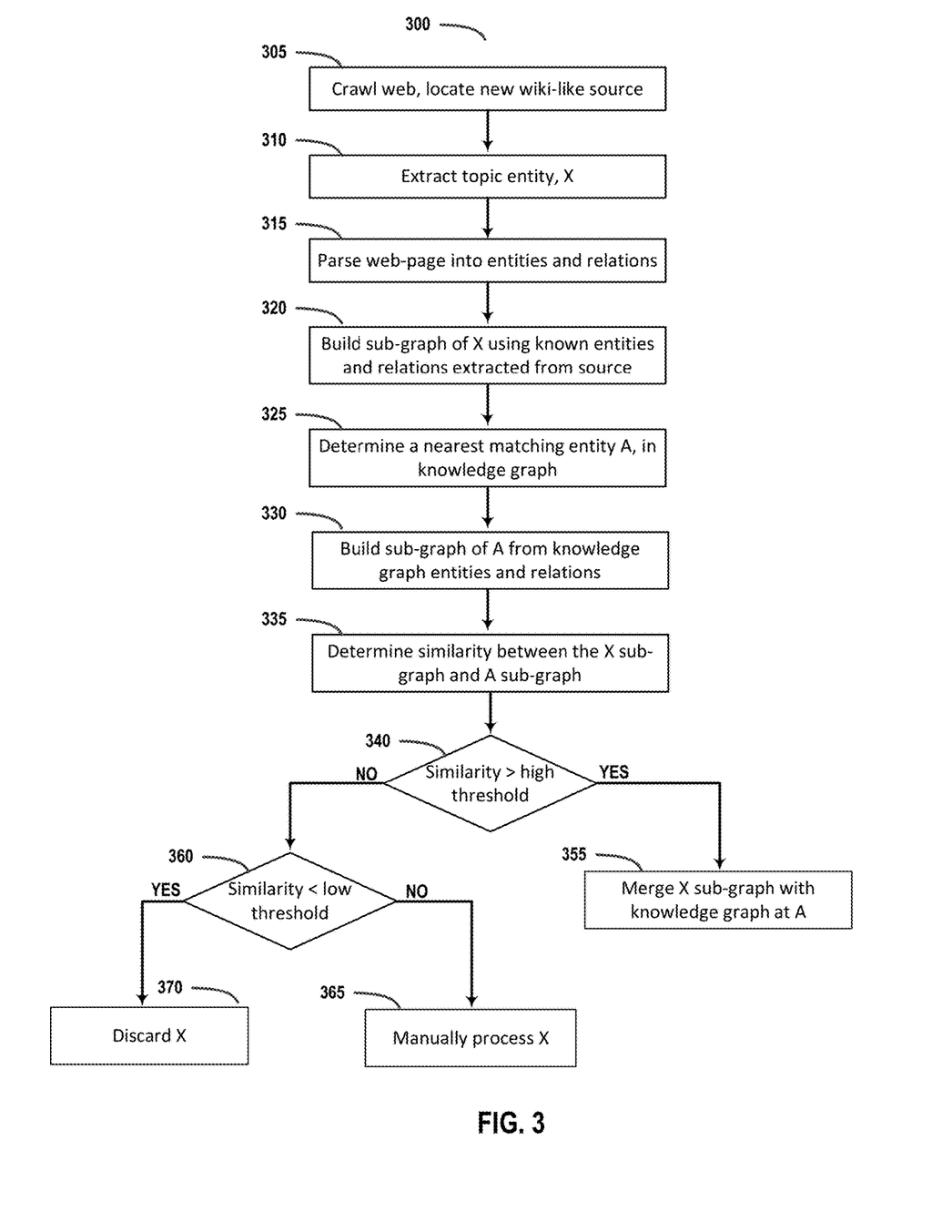
FIG. 3 is a block flow diagram of a method of enhancing and reinforcing a knowledge graph according to an embodiment of the invention.

FIG. 3 is a block flow diagram of a method 300 of enhancing and reinforcing a knowledge graph 160 according to an embodiment of the invention.

In operation 305, crawler module 120 can crawl the internet to locate data sources that may used to enhance or reinforce the knowledge graph 160. Data sources can include wiki-like articles, web pages, articles, and other content such as contained on server 107. Crawler 120 can locate a data source to process in method 300.

In operation 305, web crawler 120 can crawl the internet to locate data sources that may used to enhance or reinforce the knowledge graph 160. Data sources can include wiki-like articles, web pages, articles, and other content such as contained on server 107. Web crawler 120 can locate a data source to process in method 300.

In operation 315, entity extraction module 130 can parse the data source into a plurality of entities and relationships between entities. In an embodiment, during parsing, entity extraction module 130 can build a context vector for each entity of the data source. In an embodiment, a context vector can include words, and word frequencies, of words that describe each entity.

In operation 320, sub-graph generation module 135 can build a data source topic entity sub-graph using the data source topic entity, data source relationships connected to the data source topic entity, and data source entities pointed to by the data source relationships. In an embodiment, data source relationships and data source entities that are not known to the knowledge graph 160 can be discarded, or not added, to the data source topic entity sub-graph.

In operation 325, sub-graph correlation module 140 can determine a nearest matching candidate entity, A, in the knowledge graph 160 that corresponds to the data source topic entity, X.

In operation 330, sub-graph generation module 135 can identify, or build, a candidate entity sub-graph of knowledge graph 160 using the candidate entity, knowledge graph relationships connected to the candidate entity, and knowledge graph entities pointed to by the knowledge graph relationships that are connected to the candidate entity.

In operation 335, sub-graph correlation module 140 can determine a correlation between the data source topic entity sub-graph, X, and the candidate entity sub-graph, A, of the knowledge graph 160. Similarity scoring module 145 can compute a similarity score between the data source topic entity sub-graph X and the candidate entity sub-graph A of the knowledge graph 160. In an embodiment, the similarity score can be normalized to the range of 0 . . . 1. Similarity can be determined by comparing similarity of entity names of the sub-graphs, edges (relationships) of the sub-graphs, and contexts of the sub-graphs, or a subset of these.

In operation 340, it can be determined whether the similarity score is greater than a high threshold value. If the similarity score is greater than the high threshold value, then in operation 355 the update knowledge graph module 155 can merge the data source topic entity sub-graph X with the candidate entity sub-graph A of the knowledge graph 160.

If, in operation 340, it is determined that the similarity score is less than the high threshold value, then in operation 360 it can be determined whether the similarity score is less than a low threshold value.

If, in operation 360, it is determined that the similarity score is less than the low threshold value, then in operation 370 the data source topic entity sub-graph X can be discarded. Otherwise, in operation 365, the data source topic entity sub-graph X can be processed using the manual processing interface 150.

Figure 4:
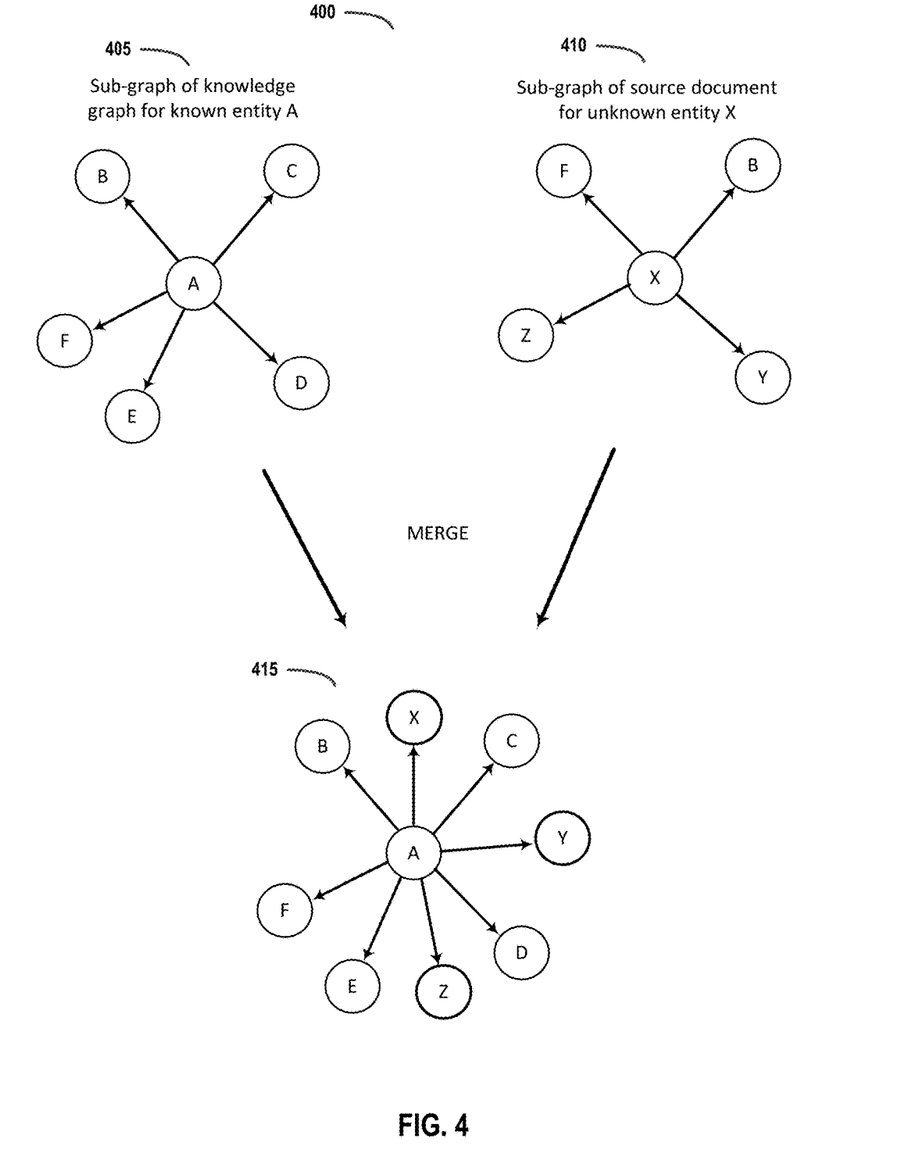
FIG. 4 is a diagram illustrating merging of a sub-graph of a knowledge graph and a sub-graph of a source document, according to one embodiment of the invention.

FIG. 4 is a diagram 400 illustrating merging of a sub-graph 405 of a knowledge graph 160 and a sub-graph 410 of a source document, according to one embodiment of the invention.

Reference 405 illustrates a candidate entity of a sub-graph of knowledge graph 160 with candidate entity "United States." The candidate entity, A, may have any number of out-going relationships and incoming relationships (not shown). An incoming relationship for "United States" may be, e.g., from entity "NATO" (not shown) with relationship "member states" (not shown) pointing toward "United States" (not shown). For simplicity, a small subset of relationship and entities for candidate entity "United States" are shown in the example candidate sub-graph, A, of the knowledge graph 160.

| 405 Sub-graph of Knowledge Graph | | |
|---|---|---|
| Candidate Entity | Relationship | Entity |
| A = United States | Capital | B = Washington D.C. |
| A = United States | Largest city | C = New York City |
| A = United States | President | D = Barack Obama |
| A = United States | Vice President | E = Joe Biden |
| A = United States | National Language | F = English |

Reference 410 illustrates a sub-graph X of data source with topic entity "U.S.A." Data source may be, e.g., a issue of the periodical U.S.A. Today, with an article about the United States stock market. Entity extraction module 130 can parse the U.S.A. Today article to obtain the topic entity "U.S.A" from the title of the data source. Entity extraction module 130 can extract the following entities and relationships from article in the data source.

| 410 Sub-graph X of Data Source | | |
|---|---|---|
| Topic Entity | Relationship | Entity |
| X = U.S.A. | Capital City | B = Washington D.C. |
| X = U.S.A. | National Language | F = English |
| X = U.S.A. | Largest Stock Market | Y = NYSE |
| X = U.S.A. | Largest Stock Traded | Z = S & P 500 |

Sub-graph correlation module 140 and similarity scoring module 145 can determine that the data source topic entity sub-graph X is sufficiently similar to the candidate entity sub-graph A of the knowledge graph 160 that the data source topic entity sub-graph should be merged into the knowledge graph 160. Data source topic entity X is added to the knowledge graph 160 at candidate entity A with relationships "also known as." Data source relationship "Largest stock market" and entity "NYSE" are added to candidate entity A of the knowledge graph. Data source relationship "Largest stock traded" and entity "S & P 500" are added to candidate entity A of the knowledge graph to generate merged sub-graph 415 of knowledge graph 160. In an embodiment, the relationship "Largest stock market" and "Largest stock traded" must exist in the knowledge graph 160. In an embodiment, the entities "NYSE" and "S&P 500" must exist in the knowledge graph 160.

| 415 Merged Sub-graph of Knowledge Graph | | |
|---|---|---|
| Entity | Relationship | Entity |
| A = United States | Capital | B = Washington D.C. |
| A = United States | Largest city | C = New York City |
| A = United States | President | D = Barack Obama |
| A = United States | Vice President | E = Joe Biden |
| A = United States | National Language | F = English |

| 415 Merged Sub-graph of Knowledge Graph | | |
|---|---|---|
| Entity | Relationship | Entity |
| A = United States | Also known as | X = U.S.A |
| A = United States | Largest Stock Market | Y = NYSE |
| A = United States | Largest Stock Traded | Z = S & P 500 |

Figure 5:
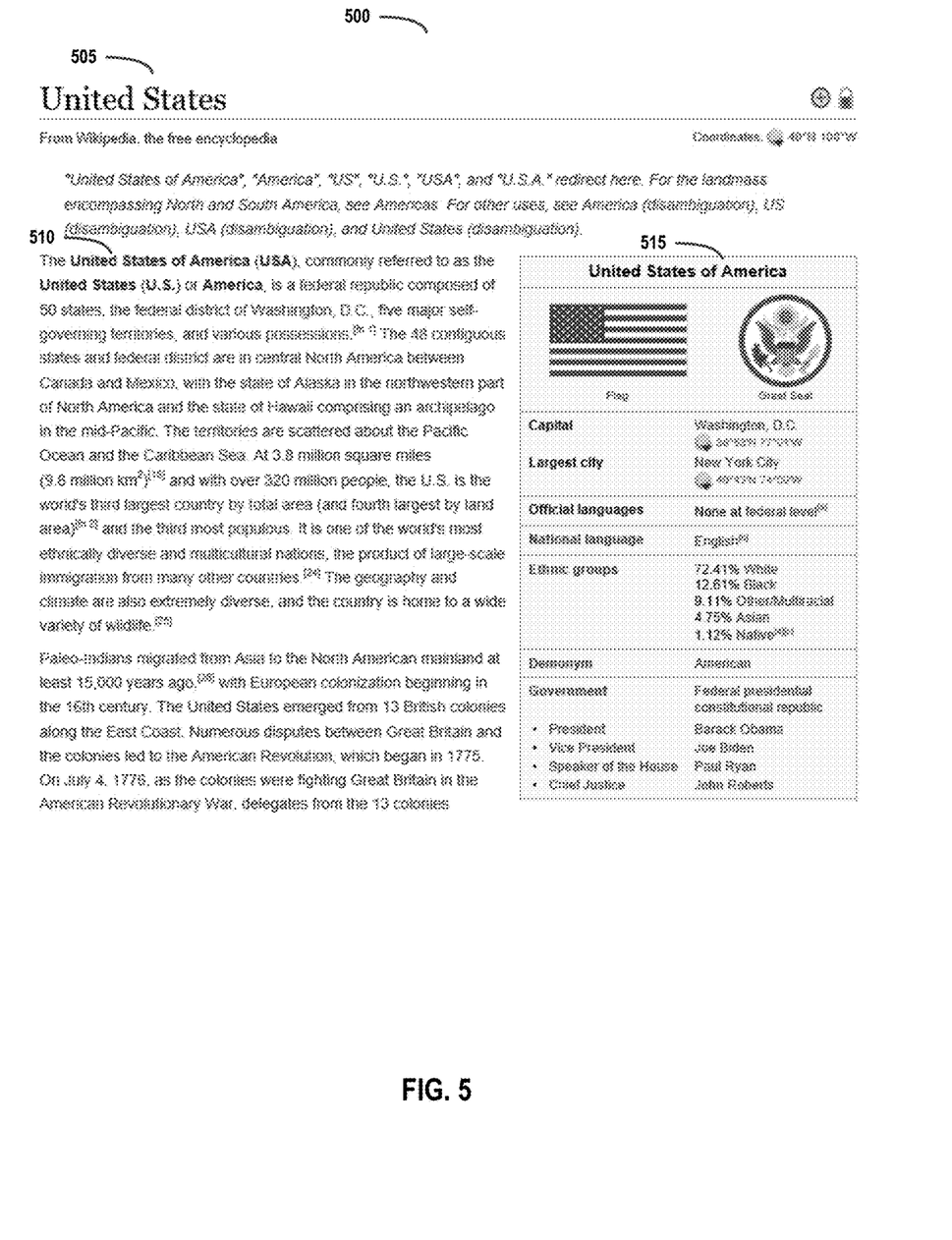
FIG. 5 is a diagram illustrating a wiki-like source document, according to one embodiment of the invention.

FIG. 5 is a diagram illustrating a wiki-like data source document 500, according to one embodiment of the invention.

Data source 500 is a wiki-like data source about topic entity "United States" 505. Data source 500 can comprise unstructured data 510 and structured data 515.

Unstructured data 510 can be a paragraph of text under the title 505 of the data source 500. The unstructured data 510 can be parsed using natural language techniques such as identifying verbs and nouns (subject, object), and adjectives, to derive relationships and entities from the unstructured data 505. For example, the first sentence of unstructured data 510 recites, "The United States of America (USA) is commonly referred to as the United States (U.S.) or America, is a federal republic . . . " From this sentence fragment, entity extraction module 130 can extract the following relationships and entities:

| Entity | Relationship | Entity |
|---|---|---|
| A = United States | Is referred to as (alias) | United States of America |
| A = United States | Is referred to as (alias) | USA |
| A = United States | Is referred to as (alias) | America |
| A = United States | Is referred to as (alias) | U.S. |
| A = United States | Government type | Federal republic |

Structured data can be a table 515 or index showing an entity and a relationship to another entity. Structured data 515 can be identified using web page mark-up language tags such as <TABLE> or <INDEX> of the data source 500. Entity extraction module 130 can extract at least the following relationships and entities from the structured data 515.

| Entity | Relationship | Entity |
|---|---|---|
| A = United States | Alias | United States of America |
| A = United States | Capital | Washington D.C. |
| A = United States | Location | 38°03' N 77°01' W |
| A = United States | Largest city | New York City |
| A = United States | Official language | None |
| A = United States | National language | English |

Figure 6:
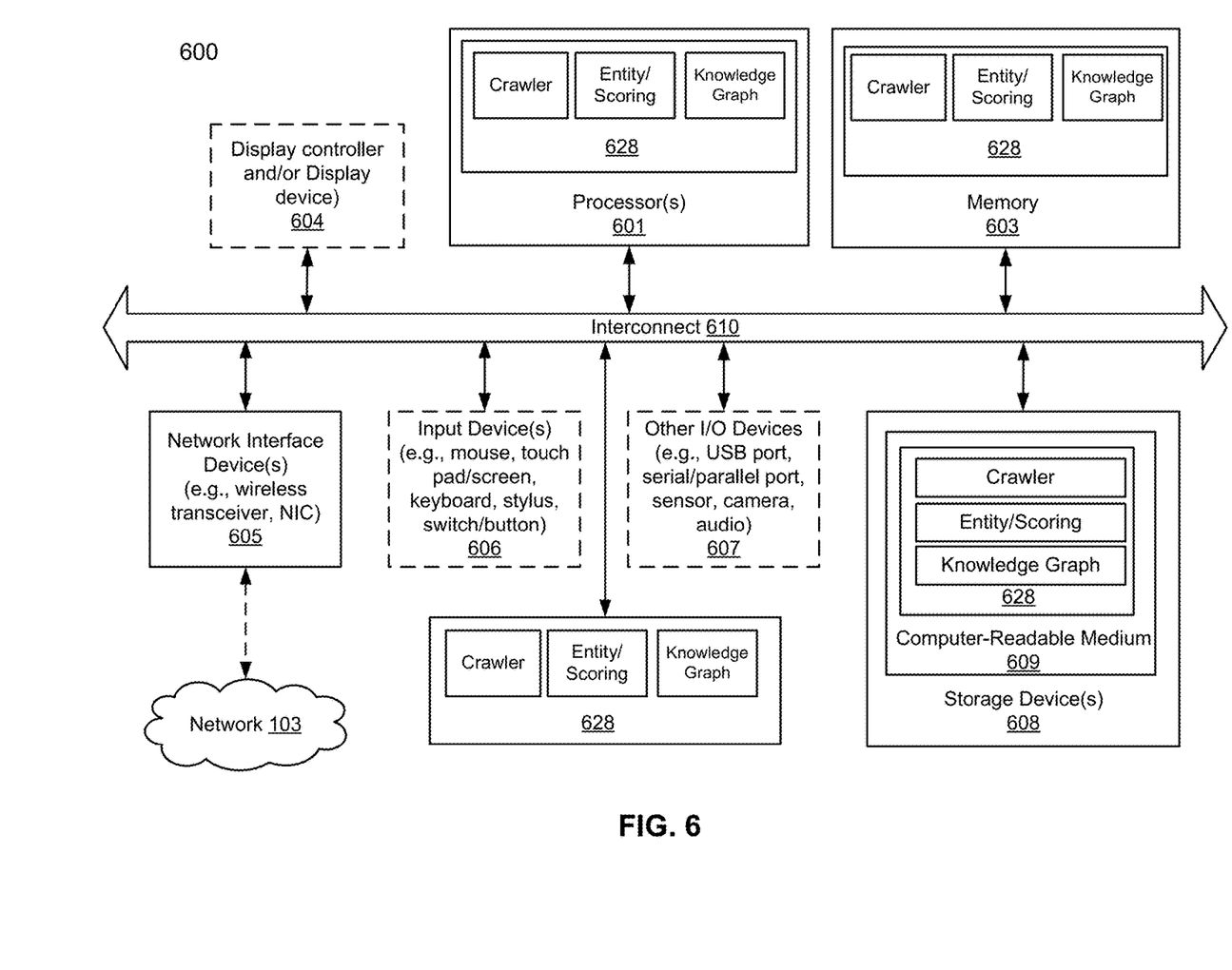
FIG. 6 is a block diagram illustrating a data processing system according to one embodiment.

FIG. 6 is a block diagram illustrating an example of a data processing system 600 which may be used with one embodiment of the invention. For example, system 600 may represent any of data processing systems described above performing any of the processes or methods described above, such as, for example, a client device 101 or 102, or a server 104 described above.

System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices 605-608, including network interface device(s) 605, optional input device(s) 606, and other optional IO device(s) 607. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., module, unit, and/or logic 628) embodying any one or more of the methodologies or functions described herein. Module/unit/logic 628 may represent any of the components described above, such as, for example, a crawler, an entity extraction/scoring modules, or a knowledge graph, as described above. Module/unit/logic 628 may also reside, completely or at least partially, within memory 603 and/or within processor 601 during execution thereof by data processing system 600, memory 603 and processor 601 also constituting machine-accessible storage media. Module/unit/logic 628 may further be transmitted or received over a network via network interface device 605.

Computer-readable storage medium 609 may also be used to store the some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 628, components and other features described herein can be implemented as discrete hardware components or integrated in the functionality of hardware components such as ASICS, FPGAs, DSPs or similar devices. In addition, module/unit/logic 628 can be implemented as firmware or functional circuitry within hardware devices. Further, module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for expanding and reinforcing a knowledge graph, the method comprising:

receiving source data comprising a source data topic entity and a plurality of source data edges, wherein each edge of the plurality of source data edges comprises a relationship-entity pair associated with the source data topic entity;

generating a source data graph from the source data topic entity and the plurality of source data edges;

identifying a candidate topic entity in a knowledge graph having a plurality of knowledge graph edges, wherein each edge of the plurality of knowledge graph edges comprises a knowledge graph relationship-entity pair associated with the knowledge graph candidate topic entity;

determining a similarity between the source data graph and a sub-graph of the knowledge graph having the candidate topic entity, the sub-graph having a plurality of knowledge graph edges associated with the candidate topic entity, wherein determining the similarity comprises determining a similarity between the plurality of source data edges and the plurality of knowledge sub-graph edges, and wherein determining the similarity between the plurality of source data graph edges and the plurality of knowledge sub-graph edges comprises determining a ratio of an intersection of the plurality of source data graph edges with the plurality of knowledge sub-graph edges to a union of the plurality of source data edges with the plurality of knowledge sub-graph edges;

merging the source data graph into the knowledge graph, in response to determining that the similarity is greater than a threshold value.

2. The method of claim 1, further comprising:
generating a sub-graph of the knowledge graph using the knowledge graph topic candidate entity and the plurality of knowledge graph edges.

3. The method of claim 1, wherein the relationship in each of the plurality of source data edges exists in the knowledge graph.

4. The method of claim 1, wherein the entity in each of the plurality of source data edges exists in the knowledge graph.

5. The method of claim 1, wherein determining the similarity further comprises:
determining a similarity between the source data topic entity and the knowledge graph candidate topic entity.

6. The method of claim 5, wherein determining the similarity further comprises:
determining a similarity between a context of the source data topic entity and a context of the knowledge graph candidate topic entity,
wherein a context comprises a plurality of words and word frequencies for an entity.

7. The method of claim 5, wherein determining the similarity between the source data topic entity and the knowledge graph candidate topic entity comprises translating a language of the source data topic entity.

8. A non-transitory computer-medium having stored thereon executable instructions that, when executed by at least one hardware processor, perform operations for automating comprising:
receiving source data comprising a source data topic entity and a plurality of source data edges, wherein each edge of the plurality of source data edges comprises a relationship-entity pair associated with the source data topic entity;
generating a source data graph from the source data topic entity and the plurality of source data edges;
identifying a candidate topic entity in a knowledge graph having a plurality of knowledge graph edges, wherein each edge of the plurality of knowledge graph edges comprises a knowledge graph relationship-entity pair associated with the knowledge graph candidate topic entity;
determining a similarity between the source data graph and a sub-graph of the knowledge graph having the candidate topic entity, the sub-graph having a plurality of knowledge graph edges associated with the candidate topic entity, wherein determining the similarity comprises determining a similarity between the plurality of source data edges and the plurality of knowledge sub-graph edges, and wherein determining the similarity between the plurality of source data graph edges and the plurality of knowledge sub-graph edges comprises determining a ratio of an intersection of the plurality of source data graph edges with the plurality of knowledge sub-graph edges to a union of the plurality of source data edges with the plurality of knowledge sub-graph edges;
merging the source data graph into the knowledge graph, in response to determining that the similarity is greater than a threshold value.

9. The medium of claim 8, further comprising:
generating a sub-graph of the knowledge graph using the knowledge graph topic candidate entity and the plurality of knowledge graph edges.

10. The medium of claim 8, wherein the relationship in each of the plurality of source data edges exists in the knowledge graph.

11. The medium of claim 8, wherein the entity in each of the plurality of source data edges exists in the knowledge graph.

12. The medium of claim 8, wherein determining the similarity further comprises:
determining a similarity between the source data topic entity and the knowledge graph candidate topic entity.

13. The medium of claim 12, wherein determining the similarity further comprises:
determining a similarity between a context of the source data topic entity and a context of the knowledge graph candidate topic entity,
wherein a context comprises a plurality of words and word frequencies for an entity.

14. The medium of claim 12, wherein determining the similarity between the source data topic entity and the knowledge graph candidate topic entity comprises translating a language of the source data topic entity.

15. A system comprising at least one hardware processor coupled to a memory, the memory having stored thereon executable instructions that, when executed by the at least one hardware processor, perform operations for automating comprising:
receiving source data comprising a source data topic entity and a plurality of source data edges, wherein each edge of the plurality of source data edges comprises a relationship-entity pair associated with the source data topic entity;
generating a source data graph from the source data topic entity and the plurality of source data edges;
identifying a candidate topic entity in a knowledge graph having a plurality of knowledge graph edges, wherein each edge of the plurality of knowledge graph edges comprises a knowledge graph relationship-entity pair associated with the knowledge graph candidate topic entity;
determining a similarity between the source data graph and a sub-graph of the knowledge graph having the candidate topic entity, the sub-graph having a plurality of knowledge graph edges associated with the candidate topic entity, wherein determining the similarity comprises determining a similarity between the plurality of source data edges and the plurality of knowledge sub-graph edges, and wherein determining the similarity between the plurality of source data graph edges and the plurality of knowledge sub-graph edges comprises determining a ratio of an intersection of the plurality of source data graph edges with the plurality of knowledge sub-graph edges to a union of the plurality of source data edges with the plurality of knowledge sub-graph edges;
merging the source data graph into the knowledge graph, in response to determining that the similarity is greater than a threshold value.

16. The system of claim 15, further comprising:
generating a sub-graph of the knowledge graph using the knowledge graph topic candidate entity and the plurality of knowledge graph edges.

17. The system of claim 15, wherein the relationship in each of the plurality of source data edges exists in the knowledge graph.

18. The system of claim 15, wherein the entity in each of the plurality of source data edges exists in the knowledge graph.

19. The system of claim 15, wherein determining the similarity further comprises:
  determining a similarity between the source data topic entity and the knowledge graph candidate topic entity.

20. The system of claim 19, wherein determining the similarity further comprises:
  determining a similarity between a context of the source data topic entity and a context of the knowledge graph candidate topic entity,
    wherein a context comprises a plurality of words and word frequencies for an entity.

21. The system of claim 19, wherein determining the similarity between the source data topic entity and the knowledge graph candidate topic entity comprises translating a language of the source data topic entity.

* * * * *